United States Patent Office 3,321,811
Patented May 30, 1967

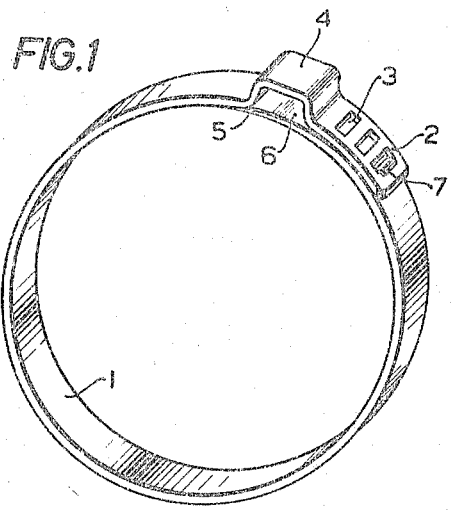
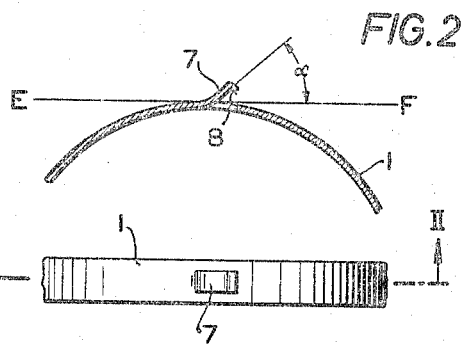
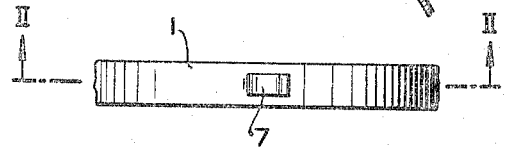
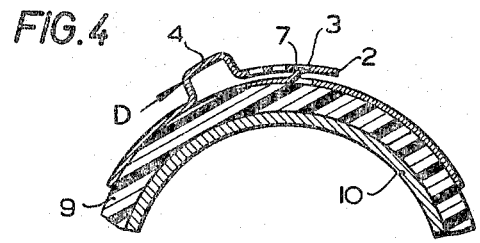

3,321,811
METAL CLAMPING BAND
Karl Thomas, Bergsdorf, Germany, assignor to Jurid Werke G.m.b.H., Hamburg, Germany, a firm of Germany
Filed Mar. 31, 1965, Ser. No. 444,255
2 Claims. (Cl. 24—20)

This invention relates to a metal band for firmly clamping hose, sleeves, tubes and similar parts of rubber or plastic materials upon pipes, tubular connection pieces or the like.

In many industries, particularly the automobile industry, it is often necessary to connect resilient parts made of rubber or plastic with metal parts. By way of example, plaited bellows of a variety of sizes for heads of axles, steerings, guides for brake cables and the like must be fitted upon corresponding supports which are usually made of metal. Similar connections are also required for conduits for the heating of cars, or for cooling water and cooling air. The parts of rubber or plastic which are to be mounted upon supports must be held in place by special means so that they will not be able to slide off. Since a car contains a large number of such connections, it is necessary to reduce the work of mounting them to the greatest possible extent. Furthermore, it is necessary to provide a tight connection so as to avoid the penetration of dust or the possibility that the flowing medium can escape. As a rule, so called hose clamps are used for this purpose, consisting of metal bands with a screw connection, whereby the tightening of the screw diminishes the diameter of the band. Bands with buckle-like connections are also known. Furthermore, tubular clamps are used for the same purpose which consist of a metal band provided practically along its entire length with holes engaged from the outside by a hook. The tensioning takes place by a fold which is compressed by pliers. Clamps of this type are usable for parts having a large variety of diameters, but they also have various drawbacks. For example, when parts consisting of soft rubber are being mounted, the rubber penetrates into the openings of the band when pressure is exerted. When the clamp is being closed the rubber, the sliding movement of which is prevented, is compressed at the clamping location and forms a fold which can cause leakage. Very thin rubber parts can be damaged by the end of the hook which engages from the outside under the band. In case of a hose with a small diameter being tied up with a long band originally destined for a hose with a larger diameter, a large overlap of the band will result. The band sections located between the holes exert such tight pressure that when the fold is compressed, no force remains to properly press the tube against the connecting part. Furthermore, the hook provided at the end of the band is weakened during the connecting operation and is easily disengaged.

It is an object of the present invention to eliminate the drawbacks of prior art constructions and to provide a band for interconnecting tubular parts, which is simple in construction, easy to apply, and most effective in operation.

Other objects of the present invention will become apparent in the course of the following specification.

In the accomplishment of the objectives of the present invention it was found desirable to provide a metal band which is bent to conform to the shape of the support to which it is to be applied, and which is provided with several openings engaged by a tooth and used to compensate for tolerances in the dimensions of the support and the wall thickness of the tubular part. The number of openings depends upon the extent of the tolerances. Thus a specific metal band is intended for a specific connection. It was found in actual practice that this arrangement saves substantial costs involved in the mounting of the parts, as compared to connections which must be initially put together or adjusted to a specific diameter by other means. The bent metal band of the present invention is slid upon the mounted sleeve and is tensioned by pressure against the fold. If the connection corresponds to the largest size of the parts, the tooth can be inserted into only one opening and no other. By compressing the fold the required tension is attained which is sufficient to provide a tight connection for the sleeve. When the connection corresponds to the smallest size of the parts, pressure is exerted against the fold and the tooth is introduced into one of the following openings until the required preload is attained. Then, as already stated, the fold is compressed. Actual experience has shown that particularly in automobile machinery where usually little space is available, the metal band of the present invention with only one fold makes it possible to provide practically every connection without difficulties and in the shortest possible time.

The bent metal band of the present invention has a completely smooth inner surface and thus can be easily tensioned by applying pressure upon the fold in the direction of the circumference. When the fold is pressed together no thickening can be formed since the metal band slides easily over the sleeve and the band end extends only for a short distance beyond the opening of the fold.

The metal band of the present invention is of uniform width and has no extended parts formed by buckles or other elements. This already has substantial advantages from the manufacturing point of view. Furthermore, a flat and smooth side edge of the band is also particularly advantageous to provide tightness when the support upon which the tubes or other parts are to be placed, is provided with a bead. When the tube is subjected to pressure an axial shifting takes place which tends to pull the tube away from the support. The metal band of the present invention when applied, prevents the sliding movement and engages with its side edge the bead of the support. The tube is pressed at the bead against the support and provides a completely tight connection at that location. Thus, the metal band is subjected only to axial pressure since pressure cannot extend under the metal band. Consequently, the present invention makes it possible to increase pressure to a very great extent without subjecting a comparatively thin metal band to excessive pressure.

A particular advantage of the present invention results when the rounded metal band prior to its use is closed by inserting the hook into one of the openings provided at the end of the band. The rings which are thus produced, do not clasp each other in a storage container so that they can be conveniently removed from the container piece by piece without the danger that one hook will engage another ring. This is not the case when prior art open clamps are removed from a container, since then there is the danger that comparatively thin bands will become interconnected and thus will be deformed while being removed.

The invention will appear more clearly from the following detailed description when taken in connection with the accompanying drawings, showing by way of example, a preferred embodiment of the inventive idea:

In the drawings:

FIGURE 1 is a perspective view of a metal band in its closed condition.

FIGURE 2 is a section along the line II—II of FIGURE 3 and illustrates the tooth of the band.

FIGURE 3 is a top view of the band shown in FIGURE 1.

FIGURE 4 is a partial section through the metal band provided with a fold, openings and a tooth, when in actual use.

Figure 5:
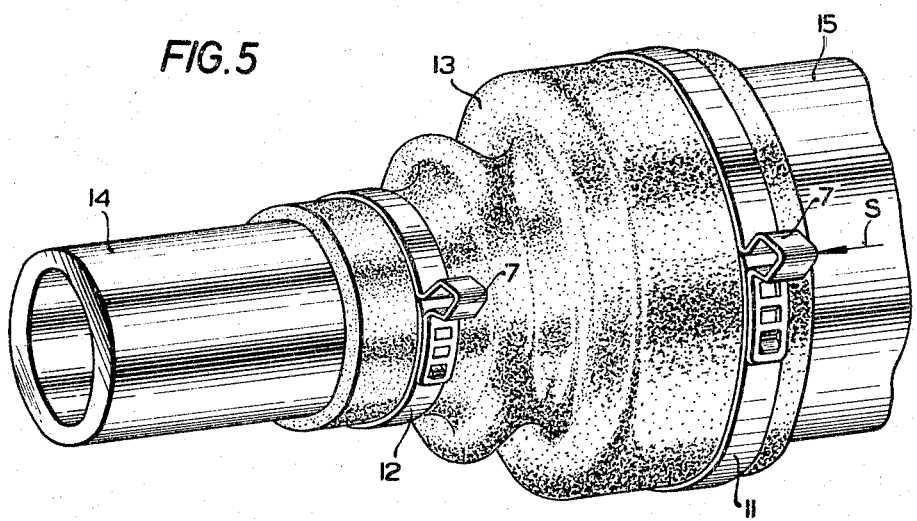
FIGURE 5 is a perspective view of a complete sleeve connection.

The metal band 1 of the present invention, as shown in FIG. 1, has a completely smooth inner surface. The band can be manufactured from a variety of metals. Preferably a steel band is used having a strength of 34 to 40 kg. per mm.$^2$. The band may be provided with a coating of any suitable type and thickness to prevent corrosion. The end 2 of the band is provided with openings 3. Close to the openings 3 the band has an outwardly extending fold 4. The opposite end 5 of the band extends under the end 2 and covers the opening 6 of the fold. The end 5 of the band is provided with a tooth 7 which fits into any one of the openings 3.

FIGURES 2 and 3 show the shape of the tooth which extends at an angle $\alpha$ to a tangential line E–F extending through the base of the tooth. The angle $\alpha$ ranges between 40° and 80°. The head of the tooth has a short hook 8. The tooth 7 is formed out of a portion of the metal band by stamping and bending and has a great resistance against shearing and bending forces.

As shown in FIGURE 4, when pressure in the direction of the arrow D is exerted upon the fold 4, the edge of an opening 3 will slide along the side of the tooth 7 and thus will raise the end 2 of the band. Then the tooth 7 will be inserted by its own spring action into the following opening 3. The band is used for connection between a support 10 and a tube or sleeve 9.

FIGURE 5 shows the connection of a sleeve 13 of different diameters with two tubular supports 14 and 15, the support 15 having a larger diameter than the support 14. The connecting rings 11 and 12 having corresponding diameters are shown in their mounted positions. When pliers are used to fix the rings, their folded portions will be bent angularly, as indicated at 7' in FIG. 5.

Figure 6:
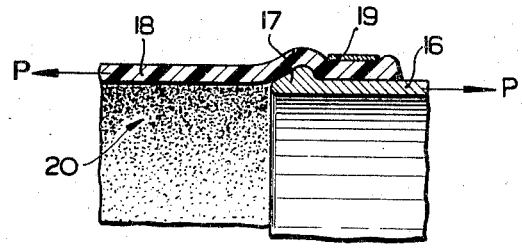
FIGURE 6 is a partial section illustrating a support provided with a bead.

FIGURE 6 shows a support 16 provided with an annular bead 17 and a hose 18 mounted thereon. A ring 19 provides the connection between these two parts. Tensions produced by excessive inner pressures pull the bead 17 of the support 16 against the connecting ring 19. Thus the medium 20 located inside the tubular parts can penetrate only to the bead 17 and cannot pass beyond the bead so as to provide radial forces which would be exerted against the metal band and the compressed fold thereof. Therefore, this connection makes it possible to withstand substantially greater inner pressures. When inner pressures are not so great, a perfectly tight connection can be attained without the use of a beaded portion.

It is apparent that the example described above has been given solely by way of illustration and not by way of limitation and that it is subject to many variations and modifications within the scope of the present invention. All such variations and modifications are to be included within the scope of the present invention.

What is claimed is:

1. A one piece metal band for the clamping of hose, sleeves and similar formed parts of rubber or plastics upon tubes or supports, said band having two ends, an outwardly extending compressible fold integral with said band, there being a plurality of openings located side by side upon the band adjacent one of the ends thereof and between said fold and said one end, a tooth integral with said band stamped out therefrom and located adjacent the other end of the band, said tooth being adapted to engage from the inside any one of said openings when an end portion of the band extends over the other end portion thereof, said tooth being located at a distance from said other end such that the adjacent end portion covers said fold when said tooth is located in any one of said openings.

2. A band in accordance with claim 1 wherein the stamped out tooth extends at an angle from 40° to 80° to a tangential base line, said tooth having a hook at its outer end.

References Cited

UNITED STATES PATENTS

| | | | |
|---|---|---|---|
| 1,183,285 | 5/1916 | Englund | 24—272 |
| 3,235,925 | 2/1966 | Gerhardt et al. | 24—23 |

FOREIGN PATENTS

| | | |
|---|---|---|
| 1,154,417 | 11/1957 | France. |
| 1,333,397 | 6/1963 | France. |
| 1,380,312 | 10/1964 | France. |
| 17,444 | of/1905 | Great Britain. |
| 932,116 | 7/1963 | Great Britain. |
| 329,139 | 5/1958 | Switzerland. |

WILLIAM FELDMAN, *Primary Examiner.*

D. A. GRIFFIN, *Assistant Examiner.*

Disclaimer 3,321,811.—*Karl Thomas*, Bergsdorf, Germany. METAL CLAMPING BAND. Patent dated May 30, 1967. Disclaimer filed Feb. 6, 1975, by the assignee, *Jurid Werke G.m.b.H.*

Hereby enters this disclaimer to all claims of said patent.

[*Official Gazette March 11, 1975.*]